United States Patent
Bachmann

[15] 3,665,961
[45] May 30, 1972

[54] MANIFOLD SYSTEM FOR LOGIC VALVES

[72] Inventor: Wilhelm Bachmann, Godshorn, Germany

[73] Assignee: Westinghouse Bremsen-Und Apparatebau G.m.b.H., Hannover, Germany

[22] Filed: Feb. 2, 1971

[21] Appl. No.: 111,899

[30] Foreign Application Priority Data

Mar. 19, 1970 Germany..................G 70 10 075.3

[52] U.S. Cl. ..........................................137/608
[51] Int. Cl. .............................................F17d 1/00
[58] Field of Search .................137/608, 270, 271, 81.5

[56] References Cited

UNITED STATES PATENTS

| | | | |
|---|---|---|---|
| 3,384,115 | 5/1968 | Drazan et al. | 137/608 |
| 3,465,774 | 9/1969 | Kautz et al. | 137/608 X |
| 3,509,904 | 5/1970 | Olson | 137/608 X |
| 3,516,436 | 6/1970 | Klaus et al. | 137/608 X |
| 3,516,638 | 6/1970 | Piggott | 137/608 X |
| 3,530,884 | 9/1970 | Kutz | 137/608 |
| 3,547,139 | 12/1970 | Van Berkum | 137/608 X |
| 3,556,147 | 1/1971 | Sizer | 137/608 |
| 3,559,687 | 2/1971 | Aslan | 137/608 X |
| 3,561,469 | 2/1971 | Kellstrom et al. | 137/608 X |
| 3,572,368 | 3/1971 | Bullmer | 137/608 X |

Primary Examiner—Samuel Scott
Attorney—Ralph W. McIntire, Jr.

[57] ABSTRACT

This invention relates to a manifold through which a source of fluid under pressure is connected to a plurality of logic valves by means of pipes or pieces of tubing each having a bend therein of either 90° or 180° the radius of these bends being that minimum without which a reduction of the internal cross-sectional area of the respective pipe or tubing is effected. The logic valves are removably mounted on top of a flat horizontal plate provided with a plurality of bores through which extend one end of the pipes or pieces of tubing for connection to a corresponding logic valve by some suitable means such as socket connections and sealing rings. The other end of each pipe or piece of tubing extends either through another bore in the plate for connection to another logic valve or is connected to a vertically arranged pipe bracket the height of which is determined by the radius of the bends in the pipes or pieces of tubing. The upper end of the pipe bracket is suitably connected as by screws to one end of the flat horizontal plate and the lower end is likewise secured to one end of a thin housing member in the form of an angle bracket one side of which extends beneath the pipes or tubing in abutting relation therewith. The other side of this angle bracket extends parallel to the pipe bracket and is so disposed as to support thereon the lower side of the other end of the flat horizontal plate on the upper side of which is mounted the logic valves. Thus the pipes or pieces of tubing are enclosed in a hollow box or housing which may be filled with a rigid-type foam material formed in place by using a rigid-type foam such as polyurethane to form a resilient packing around the plurality of pipes or tubes to isolate each from the other and prevent movement thereof relative to the logic valves which movement could cause rupture of the connection therewith.

11 Claims, 3 Drawing Figures

Patented May 30, 1972

3,665,961

INVENTOR.
WILHELM BACHMANN
BY Ralph W. McIntire, Jr.
ATTORNEY

MANIFOLD SYSTEM FOR LOGIC VALVES

BACKGROUND OF INVENTION

Heretofore, it has been common practice in fluid pressure operated systems to individually mount the logic valves at scattered locations, and to interconnect these valves and the source of fluid under pressure by individual sets of unenclosed piping or tubing. Such fluid pressure operated systems have a high incidence of vibration because of the constant pulsation of the fluid under pressure associated with the supply and release of this fluid from the logic valves. Such vibrations frequently effect loosening of the piping or tubing at various connection points to the logic valves and the source of pressure so as to cause leakage resulting in improper operation of these logic valves. The correction of such leakage often times requires considerable expenditure of time because of the decentralization of the piping or tubing connections.

Accordingly, it is the purpose of this invention to provide a manifold to which a source of fluid under pressure is connected and upon which is mounted a plurality of logic valves that are either supplied with fluid under pressure or connected to another logic valve by pre-bent piping or pieces of tubing the radius of which is the minimum allowable without effecting a reduction in the internal cross-sectional area of the piping or tubing.

SUMMARY OF INVENTION

According to the present invention, a novel manifold is provided for a plurality of logic valves which are removably mounted on the upper side of a flat horizontal plate that has therein a plurality of bores arranged in coaxial relation to inlet and outlet ports in the face of logic valves that abut the upper side of this plate. A plurality of short pipes or pieces of tubing are pre-bent so that their opposite ends lie in a common plane or in a pair of intersecting planes that form an angle of 90° one with the other, the radius of the bend being the minimum without which a reduction of the cross-sectional area of the pipe or tubing is effected. One end of these pipes or pieces of tubing extends through corresponding bores in the horizontal plate and are connected to either the inlet or outlet port in a respective one of the logic valves by some suitable means such as socket connections and O-ring seals. The other end of each pipe or piece of tubing extends either through another bore in the horizontal plate for connection to another logic valve or to one side of a vertically arranged pipe bracket for connection therewith by any suitable means. This vertically arranged pipe bracket comprises a comparatively short, thin plate member having a plurality of horizontal passageways extending therethrough each for receiving in one end thereof the other end of one of the pre-bent pipes or pieces of tubing and in the other end one end of a fluid pressure supply conduit. The vertical height of this pipe bracket is substantially the same as the radius of the ninety degree bend whereby this pipe bracket is vertically disposed between and connected as by screws to the lower side of one end of the horizontal plate and the upper side of one end of one arm of an angle bracket. This one arm of the angle bracket is disposed in spaced-apart parallel relation to the horizontal plate and extends beneath the plurality of pipes or pieces of tubing in abutting relation thereto thereby serving as a support therefor, the length of this one arm of the angle bracket being substantially the same as that of the horizontal plate. The length of the other arm of the angle bracket is the same as the vertical height of the pipe bracket and is so disposed as to support thereon at its upper end the other end of the horizontal plate. Accordingly, the horizontal plate, the vertically arranged pipe bracket and the angle bracket, when secured together such as by screws, enclose the pipes or pieces of tubing in a hollow housing which may be filled with a rigid-type foam such as polyurethane. This filter material forms a resilient packing that surrounds each each of the pipes or pieces of tubing and isolates one from the other. Moreover, this resilient packing prevents movement of the respective pipe or piece of tubing relative to the logic valve to which one end thereof is connected it being understood that such movement, if it occurs, could rupture the connection of the pipe or piece of tubing with the corresponding logic valve.

Figure 2:
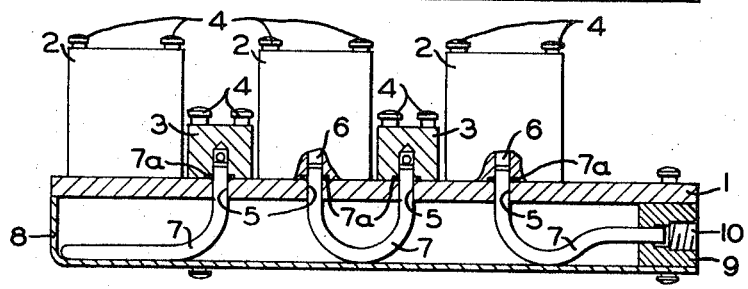
FIG. 2 is a cross-sectional view, taken along the line 2—2 of FIG. 1 and looking in the direction of the arrows, showing the angle bracket omitted from FIG. 1 and certain other structural details not made apparent in FIG. 1.
Figure 3:
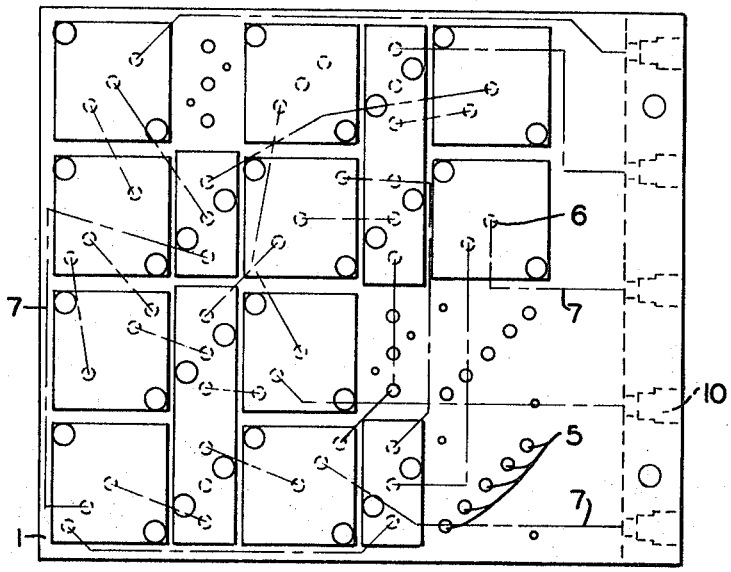
FIG. 3 is a top plan view of the manifold constituting the present invention and the plurality of logic valves carried thereon, the supply pipes or pieces of tubing and those connecting one logic valve to another being indicated by dash-dot lines.

As shown in FIGS. 2 and 3 of the drawing, a horizontally disposed flat panel or plate 1 has disposed on its upper side a plurality of logic valves 2 and 3 each of which is secured to the plate 1 by any suitable means such as, for example, a pair of screws 4. The panel or plate 1 is provided with a plurality of bores 5 which are so arranged that upon securing a logic valve 2 or 3 to the plate 1 by a pair of screws 4, one of the bores 5 in this plate is coaxial with either an inlet or an outlet port and corresponding passageway 6 in the respective logic valve. The several logic valves 2 and 3 are connected one to another or to a source of fluid under pressure by pre-bent conduits in the form of pipes or pieces of tubing 7. Each pipe or piece of tubing 7 is pre-bent so that its respective opposite ends lie in a common plane or in a pair of intersecting planes that form an angle of 90° one with the other it being understood that the radius of this bend in each pipe or piece of tubing is of that minimum value whereby the bend can be effected without causing a buckling or a reduction in the cross-sectional area of the pipe or piece of tubing. It will be understood of course that if the radius of the bend were less than this minimum value so that the cross-sectional area of the pipe or tubing were reduced, the rate of flow of fluid under pressure to or from the corresponding logic valve would likewise be reduced.

One end of each pipe or piece of tubing 7 extends through a bore 5 in the plate 1 and into one of the ports and corresponding passageways 6 in a logic valve 2 or 3 for connection therewith by some suitable means such as a socket connection and an O-ring seal 7a which is disposed about the pipe or piece of tubing 7 and interposed between the upper side of the plate 1 and the lower side of the respective logic valve.

Each pipe or piece of tubing 7 connects a logic valve 2 either to another logic valve 3 or to a source of supply of fluid under pressure in a manner now to be explained in detail.

As best shown in FIG. 2 of the drawing, one end of the c center pipe or piece of tubing 7 extends through a bore 5 in the plate 1, an O-ring seal 7a, and into the port and corresponding passageway 6 in the center logic valve 2 it being understood that this port and passageway 6 can be either for the supply of fluid under pressure to or the release of fluid under pressure from the logic valve.

Considering now the center pipe or piece of tubing 7 shown in FIG. 2, it will be noted that the other end of this pipe or piece of tubing extends through a second one of the bores 5 in the plate 1 and into a port and corresponding passageway in a logic valve 3 it being understood that this port and passageway may be for either the supply of fluid under pressure to this logic valve 3 or the release of fluid under pressure therefrom depending on whether the center logic valve 2 supplies the fluid under pressure released therefrom to the right-hand logic valve 3 or whether this right-hand logic valve 3 supplies the fluid under pressure released therefrom to the center logic valve 2.

As can be seen from FIG. 2, the three pipes or pieces of tubing 7 shown are all supported by and on a thin horizontal arm of an angle bracket 8 that constitutes a part of a hollow housing that encloses and supports the plurality of pipes or pieces of tubing 7. This horizontal arm of the angle bracket is disposed in spaced-apart parallel relation to and beneath the plate 1 and has its outer end secured as, for example, by a screw to the lower end of a vertically arranged pipe bracket 9. The upper end of this pipe bracket 9 supports the right-hand end of the horizontal plate 1 which is likewise secured thereto by a screw. It will be noted from FIG. 2 that the vertical height of the pipe bracket 9 is substantially equal to the radius of the bend in the center pipe or piece of tubing 7, or in other words, this minimum radius of the bend in the pipe or piece of tubing 7 determines the vertical height of the pipe bracket 9.

Considering now the right-hand pipe or piece of tubing 7 shown in FIG. 2, it will be noted that the opposite ends thereof lie in a pair of planes that form an angle of 90° therebetween and that the left-hand end extends through one of the bores 5 in the plate 1 and is connected to the right-hand logic valve 2 in the same manner as the center pipe or piece of tubing 7 is connected to the center logic valve 2.

As is apparent from the drawing, the pipe bracket 9 is provided with a plurality of supply connections 10 which extend therethrough, the left-hand end of each constituting a bore in which is received one end of one of the pipes or pieces of tubing 7. As shown in FIG. 2, the right-hand end of these supply connections 10 is provided with internal screw threads for receiving one end of a piece of pipe the opposite end of which is connected to a source of fluid under pressure (not shown).

Figure 1:
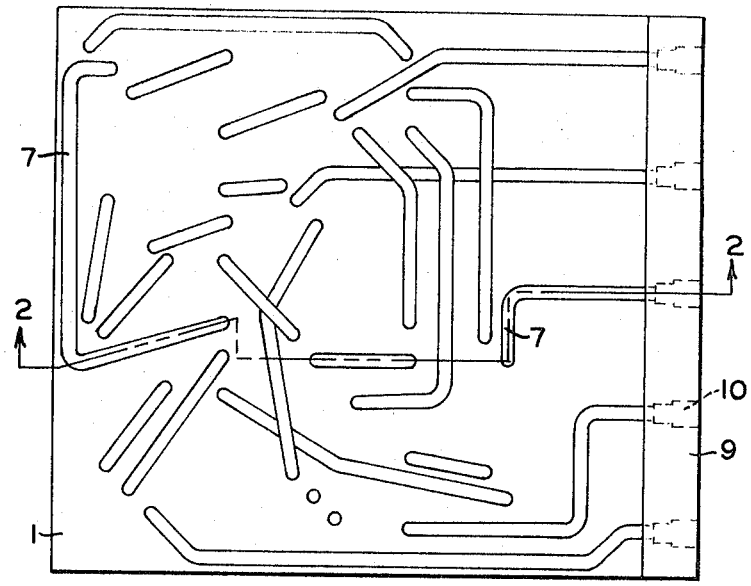
FIG. 1 is a bottom view of a manifold constituting the present invention with an angle bracket removed to show the location of pipes or pieces of tubing that supply fluid under pressure to a plurality of logic valves or connect one logic valve to another.

It is apparent from FIGS. 1, 2 and 3 of the drawing that the left-hand pipe or piece of tubing 7 shown in FIG. 2 extends in the direction of the left-hand toward the vertical arm of the angle bracket 8 and has a bend therein that enables the central portion to extend parallel to this arm, as is apparent from FIGS. 1 and 3, to another bend in this pipe. This latter bend extends through an angle of substantially 90° as is apparent from FIGS. 1 and 3. The remaining portion of this pipe or piece of tubing 7 has therein still another bend of substantially 90° to enable it to extend through one of the plurality of bores 5 in the plate 1 and be connected to either the supply or the release port and passageway 6 in the logic valve 2 shown in the lower left-hand corner of FIG. 3.

From the foregoing it is apparent that all of the pipe or pieces of tubing 7 are enclosed in a hollow housing that comprises the plate 1, angle bracket 8 and pipe bracket 9. This hollow housing may be filled with a rigid-type foam material formed in place by using a rigid-type foam such as polyurethane to form a resilient packing around the pipes or pieces of tubing 7 therein. This packing serves to isolate each pipe or piece of tubing from the other and prevents movement thereof which movement could effect loosening or rupture of the hereinbefore-mentioned socket connections and sealing rings by which one end of the pipes or pieces of tubing 7 are connected to the port and corresponding passageway 6 in the logic valves mounted on the plate 1.

Having now described the invention what I claim as new and desire to secure by Letters Patent, is:

1. A manifold assembly, comprising:
   a. a flat plate having therein a plurality of spaced-apart throughbores and a plurality of spaced-apart screw-threaded bottomed bores, said throughbores being so spaced that each will individually mate with a port of one of a plurality of valves to be removably mounted on one side of said plate, and said bottomed bores spaced to individually mate with corresponding valve mounting bores in said one valve,
   b. a pipe bracket removably secured to said plate and having extending therethrough a plurality of passageways one and of which is provided with internal screw threads for screw-threaded engagement with external screw threads provided on one end of a fluid pressure supply pipe,
   c. a plurality of pre-bent conduits each extending through one of said through bores in said plate, one end being connected to a port in one of said plurality of valves removably mounted on said plate and the other end selectively connected either to a port in another of said plurality of valves removably mounted on said plate or to the other end of one of said plurality of passageway in said pipe bracket,
   d. a support member supporting thereon said conduits, said member being removably secured to said pipe bracket and cooperating with said plate and said pipe bracket to form a hollow enclosure for said plurality of conduits, and
   e. foam material filling said hollow enclosure and forming a resilient packing engulfing said plurality of conduits.

2. A manifold assembly, as recited in claim 1, further characterized in that the radius of curvature of each of said pre-bent conduits is the minimum radius that maintains a constant cross-sectional area of said conduit from end to end thereof.

3. A manifold assembly, as recited in claim 1, further characterized in that said pipe bracket is removably secured to one end of said plate.

4. A manifold assembly, as recited in claim 1, further characterized in that said support member comprises an angle bracket having two arms, one of which is removably secured to said pipe bracket and supports said conduits.

5. A manifold assembly, as recited in claim 1, further characterized by a sealing member disposed about each of said conduits and interposed between said plate and the port in the valve to which the respective conduit is connected.

6. A manifold assembly, as recited in claim 1, further characterized in that said foam material is polyurethane.

7. A manifold assembly, as recited in claim 1, further characterized in that certain of said conduits are so pre-bent that the opposite ends thereof lie in a pair of planes that form an angle therebetween of substantially ninety degrees.

8. A manifold assembly, as recited in claim 1, further characterized in that certain of said conduits are so pre-bent that the opposite ends thereof lie in a common plane.

9. A manifold assembly, as recited in claim 1, further characterized in that certain of said conduits are so pre-bent that the opposite ends thereof lie in a pair of planes that form an angle therebetween of substantially ninety degrees, and certain others of said conduits are so pre-bent that the opposite ends thereof lie in a common plane.

10. A manifold assembly, as recited in claim 1, further characterized in that certain of said conduits have one pre-bend therein, and certain other of said conduits have a plurality of spaced-apart pre-bends therein.

11. A manifold assembly, comprising:
   a. a flat plate having therein a plurality of spaced-apart throughbores and a plurality of spaced-apart screw-threaded bottomed bores, said through bores being so spaced that each will individually mate with a port of one of a plurality of valves to be removably mounted on one side of said plate, and said bottomed bores spaced to individually mate with corresponding valve mounting bores in said one valve,
   b. a pipe bracket removably secured at one end to one end of said plate and having extending therethrough a plurality of passageways one end of which is provided with internal screw threads for screw-threaded engagement with external screw threads provided on one end of a fluid pressure supply pipe,
   c. a plurality of conduits of the same material one end of each of which is connected to a port in one of said plurality of valves, each of said conduits extending through one of said throughbores in said plate and having at the same distance from said one end a pre-bend of at least 90°, each pre-bend having that same minimum radius which maintains a constant cross-sectional area whereby said plurality of conduits extend substantially the same distance below said plate, and the other end of each of said conduits selectively connected either to a port in another of said plurality of valves removably mounted on said plate or to the other end of one of said plurality of passageways in said pipe bracket, and d. a support member supporting thereon the pre-bent portion of each of said plurality of conduits, said support member comprising an angle bracket the respective arms of which are removably secured at their outer ends respectively to the other end of said pipe bracket and the other end of said plate to form in cooperation with said plate and pipe bracket a hollow enclosure of a minimum thickness that corresponds substantially to said minimum radius for enclosing said plurality of conduits.

* * * * *